(12) United States Patent
Breedvelt-Schouten et al.

(10) Patent No.: US 10,599,730 B2
(45) Date of Patent: *Mar. 24, 2020

(54) GUIDED SEARCH VIA CONTENT ANALYTICS AND ONTOLOGY

(71) Applicant: International Business Machines Corporation, Armonk, NY (US)

(72) Inventors: Ilse M. Breedvelt-Schouten, Manotick (CA); Jana H. Jenkins, Raleigh, NC (US); Jeffrey A. Kusnitz, Campbell, CA (US); John A. Lyons, Ottawa (CA)

(73) Assignee: International Business Machines Corporation, Armonk, NY (US)

( * ) Notice: Subject to any disclaimer, the term of this patent is extended or adjusted under 35 U.S.C. 154(b) by 749 days.

This patent is subject to a terminal disclaimer.

(21) Appl. No.: 15/080,652

(22) Filed: Mar. 25, 2016

(65) Prior Publication Data

US 2017/0277794 A1    Sep. 28, 2017

(51) Int. Cl.
*G06F 16/9535* (2019.01)
*G06F 16/248* (2019.01)
*G06F 16/36* (2019.01)

(52) U.S. Cl.
CPC ........ *G06F 16/9535* (2019.01); *G06F 16/248* (2019.01); *G06F 16/36* (2019.01)

(58) Field of Classification Search
USPC ....................................................... 707/722
See application file for complete search history.

(56) References Cited

U.S. PATENT DOCUMENTS

| 7,577,718 | B2* | 8/2009 | Slawson | H04L 67/02 709/218 |
| 8,166,016 | B2* | 4/2012 | Higgins | G06F 16/9535 707/706 |
| 9,158,794 | B2* | 10/2015 | Higgins | H04W 4/023 |
| 9,405,792 | B2* | 8/2016 | Gross | G06Q 30/00 |
| 9,467,408 | B1* | 10/2016 | Sherman-Presser | H04N 21/25883 |
| 2005/0078854 | A1* | 4/2005 | Shikano | G06K 9/00664 382/103 |

(Continued)

OTHER PUBLICATIONS

Breedveelt et al., "Guided Search via Content Analytics and Ontology", U.S. Appl. No. 15/605,049, filed May 25, 2017, 24 pages.

(Continued)

*Primary Examiner* — Cam Linh T Nguyen
(74) *Attorney, Agent, or Firm* — Christopher M. Pignato

(57) ABSTRACT

An input from a user is received. The input includes a first content on the Internet to be analyzed. In response to receiving the input, the first content is analyzed. The analysis determines a plurality of topics included in the first content. One or more content related to the first content is determined. The one or more content is determined using an ontology and the plurality of topics. A first node is added to an interest panel. The first node is a link to the one or more determined content. The interest panel is an area displayed on a user interface which includes one or more nodes. An indication from the user selecting the first node is received. In response to receiving the indication, the determined one or more content associated with the first node is received. The interest panel is saved.

18 Claims, 6 Drawing Sheets

(56) References Cited

U.S. PATENT DOCUMENTS

| | | | |
|---|---|---|---|
| 2009/0254838 A1* | 10/2009 | Rao | G06F 17/30702 715/749 |
| 2009/0319512 A1* | 12/2009 | Baker | G06F 16/00 |
| 2010/0250550 A1* | 9/2010 | Tereposky | G06F 17/30595 707/741 |
| 2012/0096041 A1* | 4/2012 | Rao | G06F 17/30867 707/794 |
| 2013/0298038 A1* | 11/2013 | Spivack | H04L 65/403 715/753 |
| 2014/0089777 A1* | 3/2014 | Roiniotis | G06Q 50/01 715/234 |
| 2014/0223474 A1* | 8/2014 | Wang | H04N 21/4415 725/34 |
| 2014/0282219 A1* | 9/2014 | Haddock | G06F 16/36 715/781 |
| 2014/0344017 A1* | 11/2014 | Deephanphongs | H04N 21/25866 705/7.29 |
| 2015/0046445 A1 | 2/2015 | Sommers et al. | |
| 2015/0066908 A1 | 3/2015 | Chang et al. | |
| 2015/0120690 A1 | 4/2015 | Badros et al. | |
| 2017/0177719 A1* | 6/2017 | Sherman-Presser | G06F 16/735 |

OTHER PUBLICATIONS

IBM, List of IBM Patent Applications Treated as Related, Appendix P, Dated May 25, 2017, 2 pages.

Kim et al., "Ontology-Based TV Program Contents Retrieval and Recommendation", 2013 International Conference on Parallel and Distributed Systems. © 2013 IEEE DOI 10.1109/ICPADS.2013.97, pp. 540-545.

Ungrangsi et al., "combiSQORE: An Ontology Combination Algorithm", School of Technology, Shinawatra University, School of Engineering and Technology, Asian Institute of Technology, Printed Feb. 16, 2016, 14 Pages.

* cited by examiner

GUIDED SEARCH VIA CONTENT ANALYTICS AND ONTOLOGY

BACKGROUND OF THE INVENTION

The present invention relates generally to the field of Internet research, and more particularly to using content analytics and ontology to generate insights from an Internet search.

Performing research on the Internet may involve the use of a web browser and one of any number of available search engines. A user opens a web browser, chooses a search engine, loads the search engine, and enters a search term or phrase. The search engine will quickly return a list of potential topics of interest to the user. The user can then preview each topic and select any number of the topics for more detailed information concerning the selected topics. It is left to the user to decide which topics, in the list of topics returned by the search engine, are relevant to the area of interest of the user and which are irrelevant, and therefore, possibly distracting.

The Internet is the global system of interconnected mainframe, personal, and wireless computer networks that use the Internet protocol suite (TCP/IP or Transmission Control Protocol/Internet Protocol) to link devices worldwide. It is a network of networks that consists of private, public, academic, business, and government networks of local to global scope, linked by a broad array of electronic, wireless, and optical networking technologies. The Internet carries an extensive range of information resources and services, such as the inter-linked hypertext documents and applications of the World Wide Web (WWW or W3), electronic mail, Usenet newsgroups, telephony, and peer-to-peer networks for file sharing.

SUMMARY

Embodiments of the present invention include a method, computer program product, and system for using content analytics and ontology to generate insights from an Internet search. In one embodiment, an input from a user is received. The input includes a first content on the Internet to be analyzed. In response to receiving the input, the first content is analyzed. The analysis determines a plurality of topics included in the first content. One or more content related to the first content is determined. The one or more content is determined using an ontology and the plurality of topics. A first node is added to an interest panel. The first node is a link to the one or more determined content. The interest panel is an area displayed on a user interface which includes one or more nodes. An indication from the user selecting the first node is received. In response to receiving the indication, the determined one or more content associated with the first node is received. The interest panel is saved.

DETAILED DESCRIPTION

Some embodiments of the present invention recognize that an Internet search may result in an over-abundance of potential topics of interest. Entering a search term or phrase into a search engine may result in several pages of results relating to the term or phrase. However, not all of the results are necessarily of interest to the search engine user. Various forms of Internet marketing, such as search engine marketing and pay per click, may result in a number of websites being listed near the top of the first page in the search results and because of the marketing, may not interest the user as much as some non-marketed websites. It is left to the user to go through the search results to look for the specific results that most interest the user. This process may be very time consuming for the user.

Embodiments of the present invention recognize that there are advantages to using content analytics and ontology to generate insights from an Internet search. Embodiments of the present invention recognize that using content analytics to determine the main topics of a particular content item (i.e., topics of interest to a user) allows for an ontology engine to create a list of related topics which a user may not have considered. For example, text, voice, and image analytics may be used to determine the main topics found in an embedded video within a website. These main topics are then used by an ontology engine to determine a list of related topics that the user did not consider. This may result in unexpected insights, concerning the original topic of interest, for the user.

Figure 1:
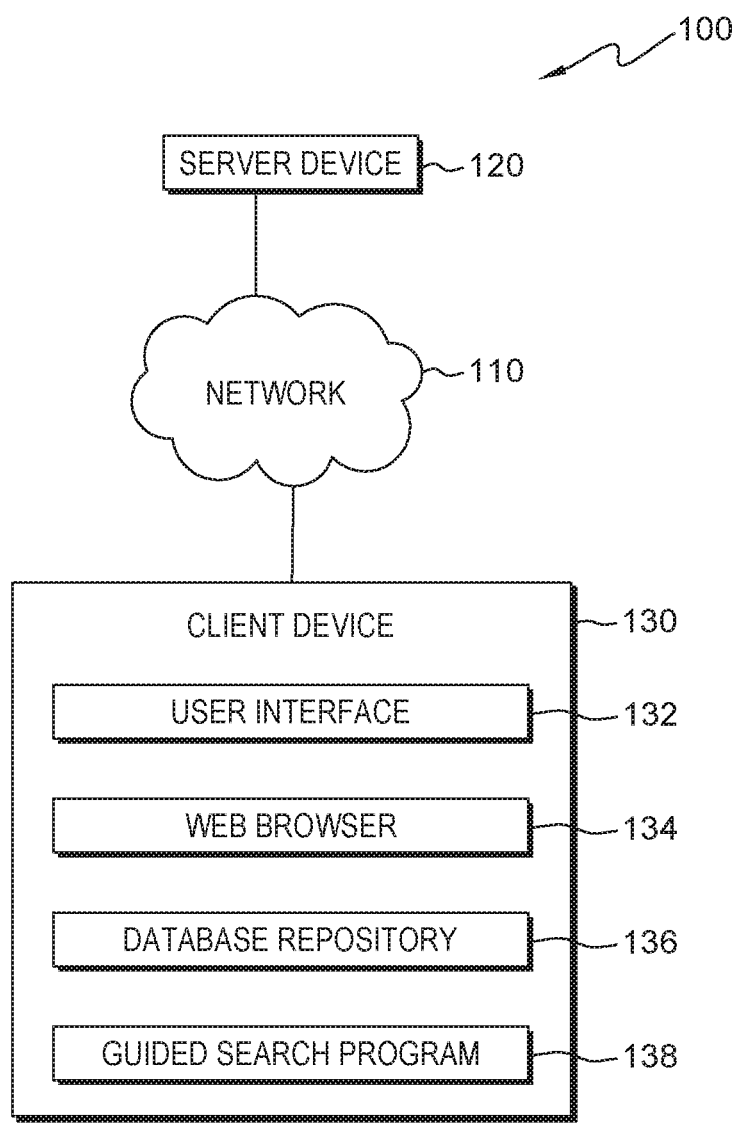
FIG. 1 is a functional block diagram of a computing environment, in accordance with an embodiment of the present invention.

FIG. 1 is a functional block diagram of a computing environment, generally designated 100, in accordance with an embodiment of the present invention. FIG. 1 provides only an illustration of one implementation and does not imply any limitations with regard to the environments in which different embodiments may be implemented. Those skilled in the art may make many modifications to the depicted environment without departing from the scope of the invention as recited by the claims.

An embodiment of computing environment 100 includes server device 120 and client device 130 interconnected by network 110. Client device 130 includes user interface 132, web browser 134, database repository 136, and guided search program 138. In example embodiments, computing environment 100 may include other computing devices not shown such as smartwatches, cell phones, smartphones, phablets, tablet computers, laptop computers, desktop computers, other computer servers or any other computer system known in the art, interconnected with server device 120 and client device 130 over network 110.

In example embodiments, server device 120 and client device 130 may connect to network 110 which enables server device 120 and client device 130 to access other computing devices and/or data not directly stored on server device 120. Network 110 may be a local area network (LAN), a telecommunications network, a wide area network (WAN) such as the Internet, or any combination of the three, and include wired, wireless or fiber optic connections. Network 110 may include one or more wired and/or wireless networks that are capable of receiving and transmitting data, voice, and/or video signals, including multimedia signals that include voice, data, and video information. In general, network 110 may be any combination of connections and protocols that will support communications between server device 120, client device 130, and any other computing devices (not shown) within computing environment 100, in accordance with embodiments of the present invention.

In embodiments of the present invention, server device 120 may be a laptop, tablet, or netbook personal computer (PC), a desktop computer, a personal digital assistant (PDA), a smartphone, or any other hand-held, programmable electronic device capable of communicating with any computing device within computing environment 100, including client device 130. In certain embodiments, server device 120 represents a computer system utilizing clustered computers and components (e.g., database server computers, application server computers, etc.) that act as a single pool of seamless resources when accessed by elements of computing environment 100. In general, server device 120 is representative of any electronic device or combination of electronic devices capable of executing computer readable program instructions. In an embodiment, server device 120 may be a web server which includes a program that returns a webpage to a user who requested the webpage via the Internet. Computing environment 100 may include any number of server device 120. Server device 120 may include components as depicted and described in further detail with respect to FIG. 4, in accordance with embodiments of the present invention.

In embodiments of the present invention, client device 130 may be a laptop, tablet, or netbook personal computer (PC), a desktop computer, a personal digital assistant (PDA), a smartphone, or any other hand-held, programmable electronic device capable of communicating with any computing device within computing environment 100, including server device 120. In certain embodiments, client device 130 represents a computer system utilizing clustered computers and components (e.g., database server computers, application server computers, etc.) that act as a single pool of seamless resources when accessed by elements of computing environment 100. In general, client device 130 is representative of any electronic device or combination of electronic devices capable of executing computer readable program instructions. Computing environment 100 may include any number of client device 130. In an embodiment, client device 130 may be used to access Internet content stored on server device 120. Client device 130 may include components as depicted and described in further detail with respect to FIG. 4, in accordance with embodiments of the present invention.

In example embodiments, user interface 132 provides an interface between a user of client device 130, network 110, and any other devices connected to network 110. User interface 132 allows a user of client device 130 to interact with web browser 134 and also enables the user to receive an indicator of one or more previous viewing locations and a summary of viewing history. In general, a user interface is the space where interactions between humans and machines occur. User interface 132 may be a graphical user interface (GUI) or a web user interface (WUI) and can display text, documents, web browser windows, user options, application interfaces, and instructions for operation, and include the information (such as graphic, text, and sound) that a program presents to a user and the control sequences the user employs to control the program. User interface 132 may also be mobile application software that provides an interface between a user of client device 130 and network 110. Mobile application software, or an "app," is a computer program designed to run on smartphones, phablets, tablet computers and other mobile devices.

In an embodiment of the present invention, web browser 134 (commonly referred to as a browser) is a software application whose primary purpose is to bring information resources to the user ("retrieval" or "fetching"), allowing them to view the information ("display", "rendering"), and then access other information ("navigation", "following links") on the Internet. In an embodiment, client device 130 may be used to access Internet content. In an embodiment, web browser 134 may be a program found on server device 120 which returns a webpage to a user who requested the webpage via the Internet. An information resource may be identified by a Uniform Resource Identifier (URI) and may be a webpage, image, video or other piece of content. The most common form of URI is the uniform resource locator (URL), frequently referred to informally as a web address. URLs occur most commonly to reference webpages (http), but may also be used for file transfer (ftp), email (mailto), database access (JDBC or Java Database Connectivity), and many other applications. Hyperlinks present in resources enable users to easily navigate their browsers to related resources. Although browsers are primarily intended to use the Internet, they can also be used to access information provided by web servers in private networks or files in file systems. Common features found in browsers include: forward and back buttons, a refresh button, a stop button, a home button, an address bar, a search bar, and a status bar.

According to an embodiment of the present invention, database repository 136 may be storage that may be written to and/or read by server device 120 and client device 130. In one embodiment, database repository 136 resides on client device 130. In other embodiments, database repository 136 may reside on server device 120 or any other device (not shown) in computing environment 100, in cloud storage or on another computing device accessible via network 110. In yet another embodiment, database repository 136 may represent multiple storage devices within client device 130. Database repository 136 may be implemented using any volatile or non-volatile storage media for storing information, as known in the art. For example, database repository 136 may be implemented with a tape library, optical library, one or more independent hard disk drives, multiple hard disk drives in a redundant array of independent disks (RAID), solid-state drives (SSD), or random-access memory (RAM). Similarly, database repository 136 may be implemented with any suitable storage architecture known in the art, such as a relational database, an object-oriented database, or one or more tables. In an embodiment of the present invention, guided search program 138 and any other applications (not shown) operating on client device 130 may store data to database repository 136. Examples of data stored to database repository 136 include user data, social data related to the user, history of usage of the system, topics of interest indicated by a user, and related topics of interest determined by guided search program 138.

In embodiments of the present invention, guided search program 138 may be a program, subprogram of a larger program, application, plurality of applications, or mobile application software which functions to use content analytics and ontology to generate insights from an Internet search. A program is a sequence of instructions written by a programmer to perform a specific task. Guided search program 138 may run by itself or may be dependent on system software (not shown) to execute. In one embodiment, guided search program 138 functions as a stand-alone program residing on client device 130. In another embodiment, guided search program 138 may be included as a part of an operating system (not shown) of client device 130. In yet another embodiment, guided search program 138 may work in conjunction with other programs, applications, etc., found on server device 120, client device 130, or in computing environment 100. In yet another embodiment, guided search program 138 may be found on other computing devices (not shown) in computing environment 100 which are interconnected to server device 120 or client device 130 via network 110.

According to embodiments of the present invention, guided search program 138 functions to use content analytics and ontology to generate insights from an Internet search. According to an embodiment of the present invention, guided search program 138 uses content analysis to determine the main topics in a particular content item indicated by a user. Based on the determined main topics, an ontology engine generates related topics of interest which may be of interest to the user. The generated topics of interest may provide unexpected insight to the user.

Figure 2:
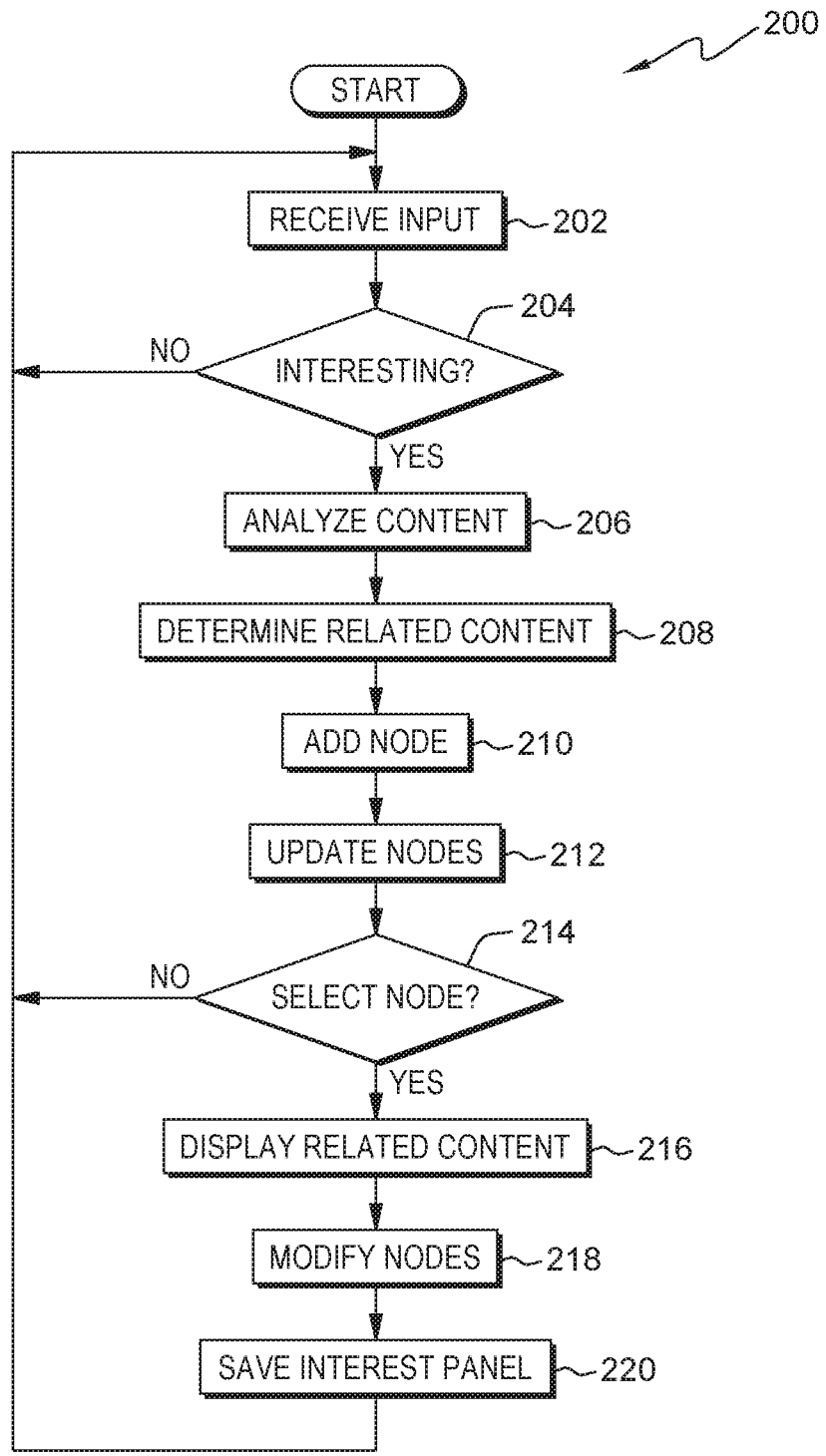
FIG. 2 is a flowchart depicting operational steps of a program that functions to use content analytics and ontology to generate insights from an Internet search, in accordance with an embodiment of the present invention.

FIG. 2 is a flowchart of workflow 200 representing operational steps for using content analytics and ontology to generate insights from an Internet search, in accordance with an embodiment of the present invention. In one embodiment, guided search program 138 performs the operational steps of workflow 200. In an alternative embodiment, while working with guided search program 138, any other program may perform the operational steps of workflow 200. In an embodiment, guided search program 138 may invoke the operational steps of workflow 200 when an indication from a user is received. In an alternative embodiment, guided search program 138 may invoke the operational steps of workflow 200 automatically upon a user opening a web browser on server device 120. In an embodiment, any of the operational steps of workflow 200 may be performed in any order.

Figure 3A:
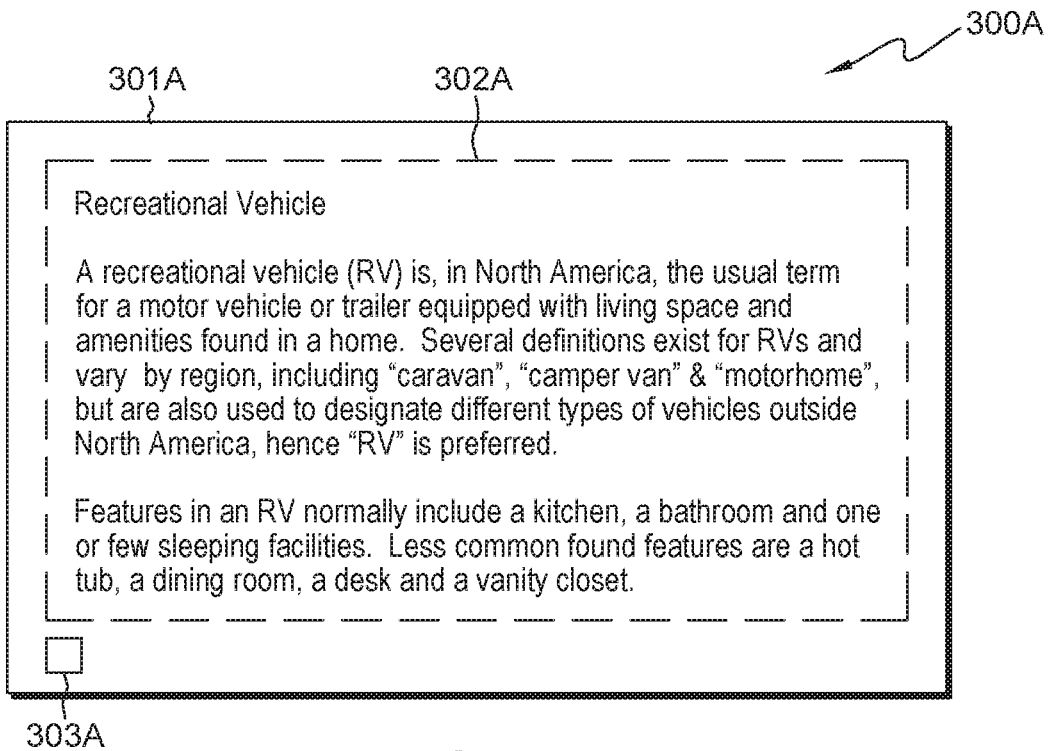
FIG. 3A through FIG. 3E are exemplary examples of using content analytics and ontology to generate insights from an Internet search, in accordance with an embodiment of the present invention.

In an embodiment, guided search program 138 receives input (step 202). In other words, guided search program 138 receives an input that a user is viewing Internet content. In an embodiment, Internet content includes text (i.e., websites, etc.), images, audio (i.e., music streaming, etc.), and video (i.e., news videos, user posted content, etc.). In an embodiment, a user is viewing a website in web browser 134 shown by user interface 132 on client device 130. The website the user is viewing is downloaded to client device 130 from server device 120 on network 110. For example, as shown in FIG. 3A, Dave is viewing website 302A displayed by user interface 301A.

In an embodiment, guided search program 138 determines whether a user indicates content is interesting (decision step 204). In other words, guided search program 138 determines whether a user had indicated that the Internet content currently being viewed by the user was found interesting according to the user. In another embodiment, guided search program determines whether a user indicates that the user wants the Internet content currently being viewed analyzed for related content. In an embodiment, a user may want Internet content analyzed for a plurality of reasons including curiosity, interest, job requirement, assignment, research, and the like. In an embodiment, the user may indicate interest by clicking a button displayed by the user interface. In another embodiment, the user may indicate interest by a gesture (e.g., if the Internet content is displayed by a touch screen, a left-to-right swiping motion on the user interface or circling the Internet content with a finger of the user or with a stylus type device). In yet another embodiment, the user may indicate interest via a spoken word or words (e.g., "I am interested"). In yet another embodiment, the user may indicate interest by facial expression or actual interaction with the Internet content as determined by an image device (not shown) in client device 130. In yet another embodiment, the user may indicate interest based on the amount of time spent with attention directed to the Internet content as determined by an image device (not shown) and a timer function (not shown) in client device 130. In one embodiment (decision step 204, NO branch), guided search program 138 determines that a user did not indicate content as interesting; therefore, guided search program 138 returns to step 202 to receive an input of Internet content. In another embodiment (decision step 204, YES branch), guided search program 138 determines that a user did indicate content as interesting; therefore, guided search program 138 proceeds to step 206.

According to an embodiment of the present invention, a user indicating interest in the Internet content results in an interest panel being displayed in the user interface. In an embodiment, if the current Internet content was previously indicated interesting by a user, a previously saved interest panel is displayed which includes the nodes saved with the interest panel. According to other embodiments, a user may indicate interest in Internet content and then open an interest panel via a menu, a gesture, or a spoken word. An interest panel is an area displayed on the user interface which includes one or more nodes. In an embodiment, an interest panel may be associated with an individual user. In another embodiment, an interest panel may be associated with more than one user (e.g., a group of people such as a family). In an embodiment, a node may be a visual depiction of the indicated interest of the user in the Internet content or be generated by guided search program 138 based on the nodes created by the user. The node may also be an object that includes information (e.g., a summary description) about the Internet content indicated as interesting by the user. The node may also be a link to the topics, as determined by guided search program 138, related to the Internet content being viewed by the user. In an embodiment, an interest panel may include any number of nodes. In another embodiment, an interest panel may be limited in the number of included nodes (e.g., no more than ten nodes). In one embodiment (decision step 204, NO branch), guided search program 138 determines that a user has not indicated the Internet content to be interesting; therefore, guided search program 138 returns to step 202 to receive input of new Internet content. In another embodiment (decision step 204, YES branch), guided search program 138 determines that a user has indicated the Internet content to be interesting; therefore, guided search program 138 proceeds to step 206.

Figure 3B:
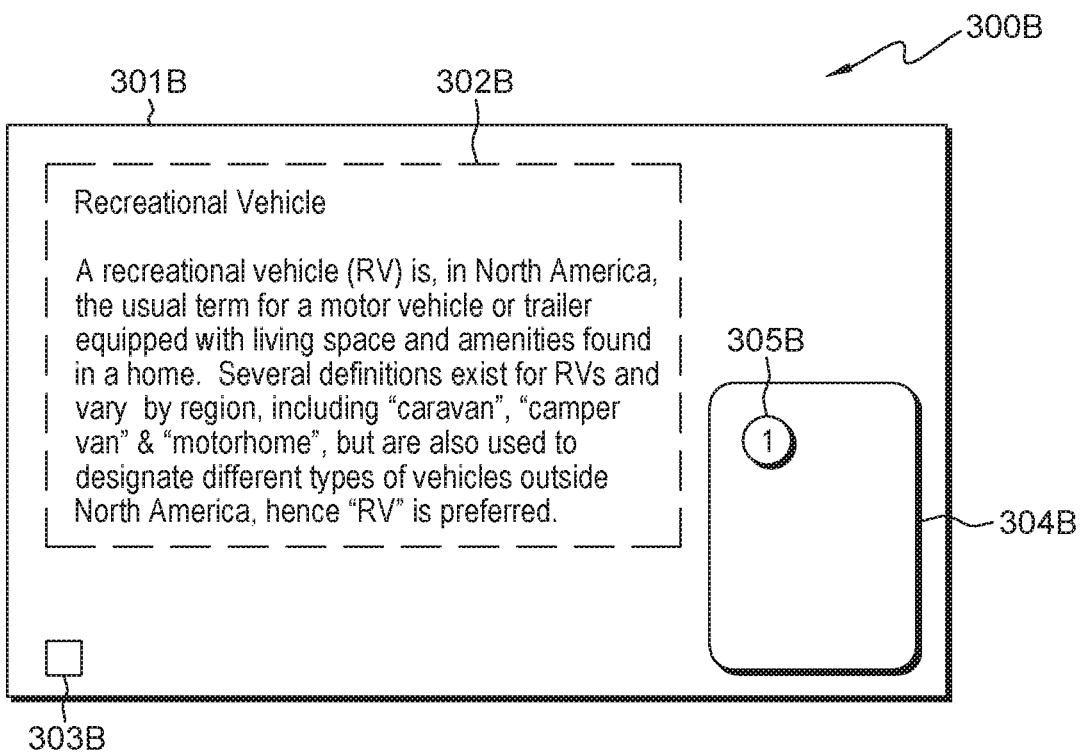

In an embodiment, based on the determination that a user finds the Internet content interesting (decision step 204, YES branch), guided search program 138 analyzes the Internet content (step 206). In other words, guided search program 138, after determining that a user finds the Internet content interesting, analyzes the Internet content. In an embodiment, the content analysis determines the main topics found in the Internet content indicated as interesting by a user. According to embodiments of the present invention, content analysis may include text analysis, sentiment analysis, video content analytics, semantic audio analysis, and image analysis. In an embodiment, guided search program 138 analyzes the Internet content displayed by web browser 134 in user interface 132 on client device 130. For example, as shown in FIG. 3B, after Dave indicates interest in website 302B displayed by user interface 301B by clicking "interest" button 303B, content analysis is performed on website 302B. Interest panel 304B is also displayed by user interface 301B.

In an embodiment, text analysis involves information retrieval, lexical analysis to study word frequency distributions, pattern recognition, tagging/annotation, information extraction, data mining techniques including link and association analysis, visualization, and predictive analytics. The overarching goal is, essentially, to turn text into data for analysis, via application of natural language processing (NLP) and analytical methods.

In an embodiment, sentiment analysis (also known as opinion mining) refers to the use of natural language processing, text analysis and computational linguistics to identify and extract subjective information in source materials. Sentiment analysis is widely applied to reviews and social media for a variety of applications, ranging from marketing to customer service.

In an embodiment, video content analytics (VCA) is the capability of automatically analyzing video to detect and determine temporal and spatial events. This technical capability is used in a wide range of domains including entertainment, health-care, retail, automotive, transport, home automation, safety and security. The algorithms can be implemented as software on general purpose machines, or as hardware in specialized video processing units. Many different functionalities can be implemented in VCA. Video Motion Detection is one of the simpler forms where motion is detected with regard to a fixed background scene. More advanced functionalities include video tracking and egomotion (i.e., the three dimensional motion of a camera within an environment) estimation. Based on the internal representation that VCA generates in the machine, it is possible to build other functionalities, such as identification, behavior analysis, or other forms of situation awareness.

In an embodiment, semantic audio analysis is the extraction of symbols or meaning from an audio stream. Speech recognition is an important semantic audio application. But for speech, other semantic operations include language, speaker, or gender identification. For more general audio or music, it includes identifying a piece of music or a movie soundtrack.

In an embodiment, image analysis is the extraction of meaningful information from images, mainly from digital images by means of digital image processing techniques, object recognition, and the like.

In an embodiment, guided search program 138 determines related content (step 208). In other words, based on the content analysis of the Internet content completed in step 206, guided search program 138 determines related content that may be of interest to the user. In an embodiment, guided search program 138 uses the determined topics from the earlier content analysis (step 206) and ontology to determine related content. In an embodiment, the determined related content is a ranked topic list based on the original Internet content a user indicated as interesting. The topic list is ranked based on the nearness of the new terms determined by the content analysis to the original terms included in the Internet content indicated as interesting. Nearness is a measure of how close the meaning of one term is to another term. If the meanings are similar, the terms are close while dissimilar meanings are said to be farther apart. Ontology may be defined as "the study of things and their relations". By using ontology, guided search program 138 finds relationships in the content analysis and uses the relationships to determine related content. In an embodiment, guided search program 138 may determine an ontology for an individual user or a specific group of user (e.g., a family) which is used to determine related content. In another embodiment, an external ontology may be used by guided search program 138 to determine related content. The external ontology may be developed and provided by any number of entities including an educational institution (e.g., a university), a company (e.g., a company that maintains a dictionary or a business that markets consumer goods), a computer using cognitive technology, and the like. According to an embodiment, the determined related content may be obvious to the user. According to another embodiment, the determined related content may not be obvious to the user and therefore, may provide unexpected insights to the user concerning the Internet content the user indicated as interesting. In an embodiment, guided search program 138 determines related content for the Internet content displayed by web browser 134 in user interface 132 on client device 130. For example, as shown in FIG. 3B, related content is determined for website 302B displayed by user interface 301B.

In an embodiment, an ontology study of at least two nodes may not yield any relationships. According to an embodiment of the present invention, if relationships are not found between two nodes, the metadata of the content may be used to find possible relationships. Metadata for webpages contain descriptions of the contents on the page, as well as keywords linked to the content, usually expressed in the form of "metatags". The metadata containing the description of the webpage and summary is often displayed in search results by search engines, making its accuracy and details important since the metadata may determine whether a user decides to visit the site or not. "Metatags" are often evaluated by search engines to help decide the relevance of a webpage, and were used as the key factor in determining position in a search at one point in time. The increase in search engine optimization (SEO) led to many websites "keyword stuffing" their metadata to trick search engines, making their websites seem more relevant than others. According to another embodiment of the present invention, if relationships are not found between two nodes, a user may look at the node history for common terms from previous related topics in order to find possible relationships.

In an embodiment, guided search program 138 adds a node (step 210). In other words, guided search program 138 adds a node, based on the related content determined in step 208, to the interest panel. In an embodiment, a single node is added to the interest panel. In another embodiment, two or more nodes are added to the interest panel when the Internet content includes two or more distinct topics. In an embodiment, a user may indicate interest in two or more distinct topics by text selection, highlighting, or any other gesture known in the art. In an embodiment, the number of allowable nodes is determined by the user. In another embodiment, the number of allowable nodes is determined by guided search program 138 based on the capability of client device 130. In an embodiment, the node is a link to the ranked topic list and the topics included in the ranked topic list may be used as search criteria. In an embodiment, the topics are ranked based on the most likely to be of interest to a user who indicated the original Internet content as interesting. In an embodiment, the original Internet content indicated as interesting by the user is also saved in the node with the determined related content (i.e., the ranked content list). In an embodiment, when the user selects a node included in the interest panel, the determined related content and the original Internet content are displayed so that the user can select any of the plurality of determined related content and explore a topic in more detail. In an embodiment, an interest panel and node are shown by user interface 132 in client device 130. For example, as shown in FIG. 3B, node 305B is added to interest panel 304B as displayed by user interface 301B.

Figure 3C:
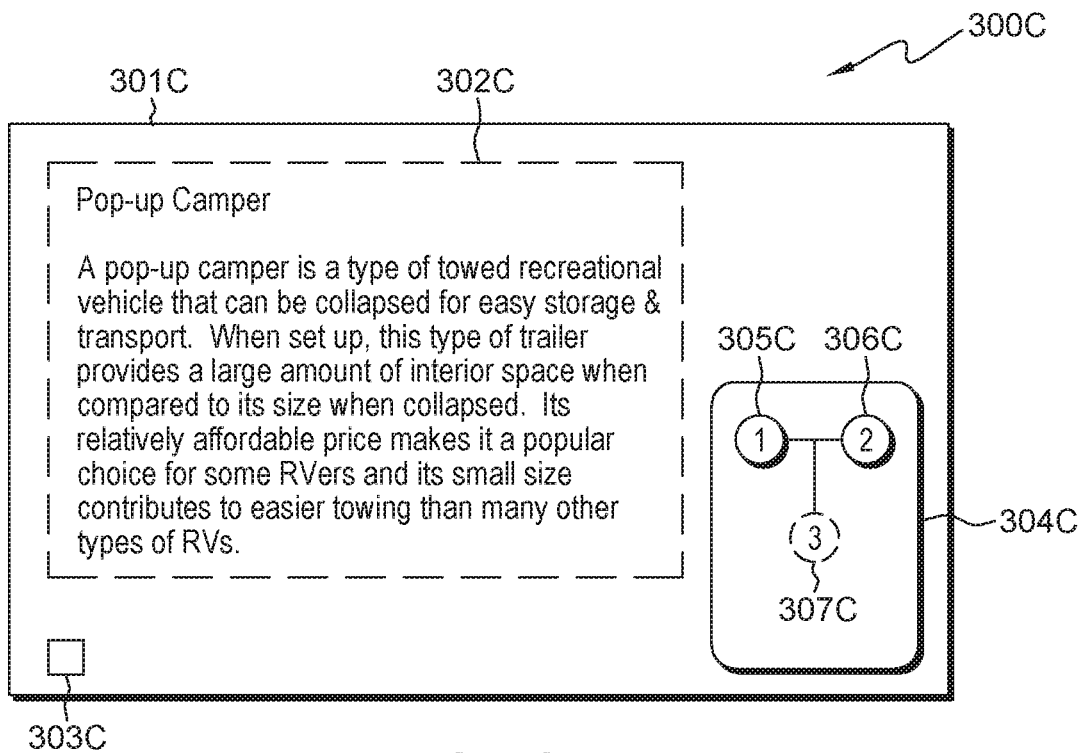

In an embodiment, guided search program 138 updates nodes (step 212). In other words, if at least one node is already found in the interest panel, guided search program 138 may connect the two nodes if the two nodes include content related to one another. In an embodiment, two nodes created by a user indicating interest in two distinct items of Internet content may be connected by the user. In another embodiment, a node determined by guided search program 138, based on nodes already present in the interest panel, may be connected by the user to the nodes already present. In yet another embodiment, nodes present in the interest panel may be connected by guided search program 138 resulting in new nodes being determined. In an embodiment, a determined node may be distinguished from non-determined nodes by a dashed outline rather than a solid outline. In another embodiment, color may be used to distinguish the two types of nodes. In yet another embodiment, different shapes may be used to distinguish the two types of nodes. In yet another embodiment, one type of node may blink to distinguish it from the other type of node. In an embodiment, two nodes displayed in user interface 132 on client device 130 may be connected by the user which in turn results in a node being determined by guided search program 138 and the determined node is connected to the other two nodes. For example, as shown in FIG. 3C, node 306C is determined based on website 302C displayed by user interface 301C. Node 306C is connected to node 305C, already present in interest panel 304C, by Dave. The result of Dave connecting node 306C with node 305C is that node 307C is determined.

In an embodiment, guided search program 138 determines whether a user selects a node (decision step 214). In other words, guided search program 138 determines whether a user has selected one of the nodes included in the interest panel by receiving an indication from the user that the user selected the node. In an embodiment (decision step 214, NO branch), guided search program 138 determines that a user has not selected one of the nodes included in the interest panel; therefore, guided search program 138 returns to step 202 to receive an input of new Internet content. In an embodiment (decision step 214, YES branch), guided search program 138 determines that a user has selected one of the nodes included in the interest panel; therefore, guided search program 138 proceeds to step 216.

Figure 3D:
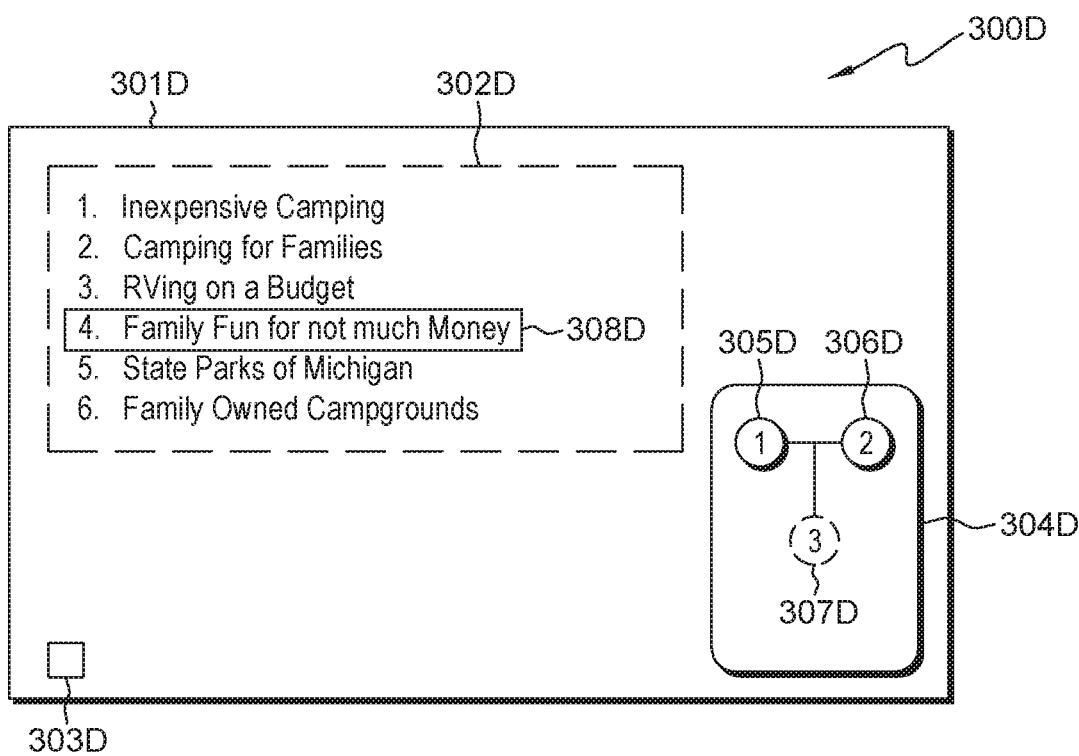

In an embodiment, based on the determination that a user has selected a node (decision step 214, YES branch), guided search program 138 displays related content (step 216). In other words, responsive to a user selecting one of the nodes included in the interest panel, guided search program 138 displays the related content of the selected node. In an embodiment, displaying the related content of the selected node allows a user to further research the original Internet content of interest. In an embodiment, the related content concerning the original Internet content of interest may be obvious to the user such that the user may have searched the related content without assistance from guided search program 138. In another embodiment, the related content concerning the original Internet content of interest may not be obvious to the user such that the user may gain unexpected insight into the original Internet content of interest. In an embodiment, a user selects a node displayed by user interface 132 on client device 130. For example, as shown in FIG. 3D, Dave selects one of node 305D, 306D, or 307D included in interest panel 304D, displayed by user interface 301D. After Dave selects one of the nodes, related content 302D is displayed by user interface 301D. Topic 308D, concerning family fun on a small budget, did not occur to Dave given that the original Internet content of interest related to recreational vehicles.

Figure 3E:
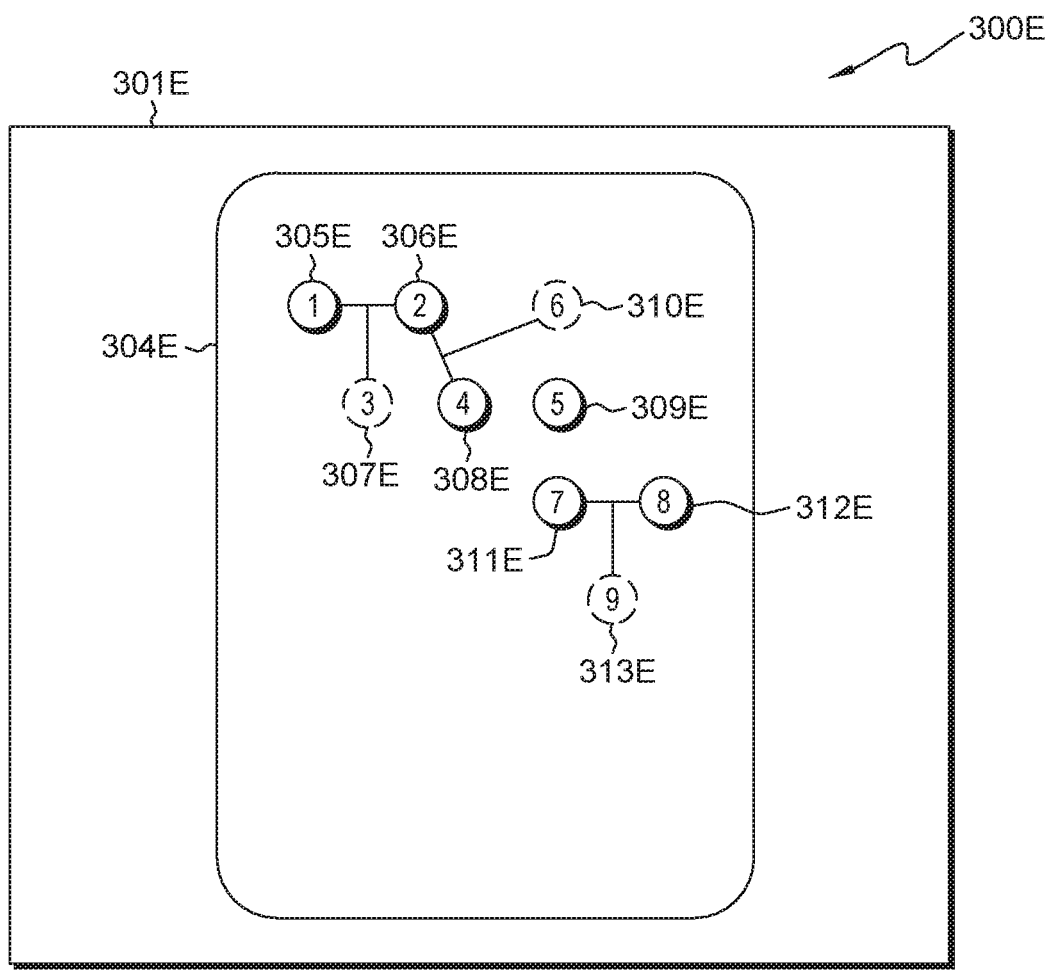

In an embodiment, guided search program 138 modifies nodes (step 218). In other words, guided search program 138 receives an indication from a user to move, connect, or delete a node or nodes and modifies the node structure based on the changes made by the user to the nodes included in the interest panel. In an embodiment, an interest panel displayed by user interface 132 on client device 130 includes a plurality of nodes added by the user via the user indicating interest in one or more Internet content items and a plurality of nodes determined by guided search program 138. For example, as shown in FIG. 3E, interest panel 304E, displayed by user interface 301E, includes user created nodes 305E, 306E, 308E, 309E, 311E, and 312E as well as nodes 307E, 310E, and 313E determined by guided search program 138. Node 310E was determined when Dave connected nodes 306E and 308E. In the same manner, node 313E was determined when Dave connected nodes 311E and 312E. Node 309E was created by Dave indicating interest in a particular Internet content item but since Dave did not find the related content of node 309E of interest, Dave did not connect node 309E to any other node.

In an embodiment, guided search program 138 saves an interest panel (step 220). In other words, guided search program 138 saves the interest panel and the plurality of associated nodes for later use by the user. In an embodiment, an interest panel being displayed by user interface 132 on client device 130 is saved to database repository 136. For example, as shown in FIG. 3E, Dave saves interest panel 304E, displayed by user interface 301E, to a hard drive on a laptop computer.

Figure 4:
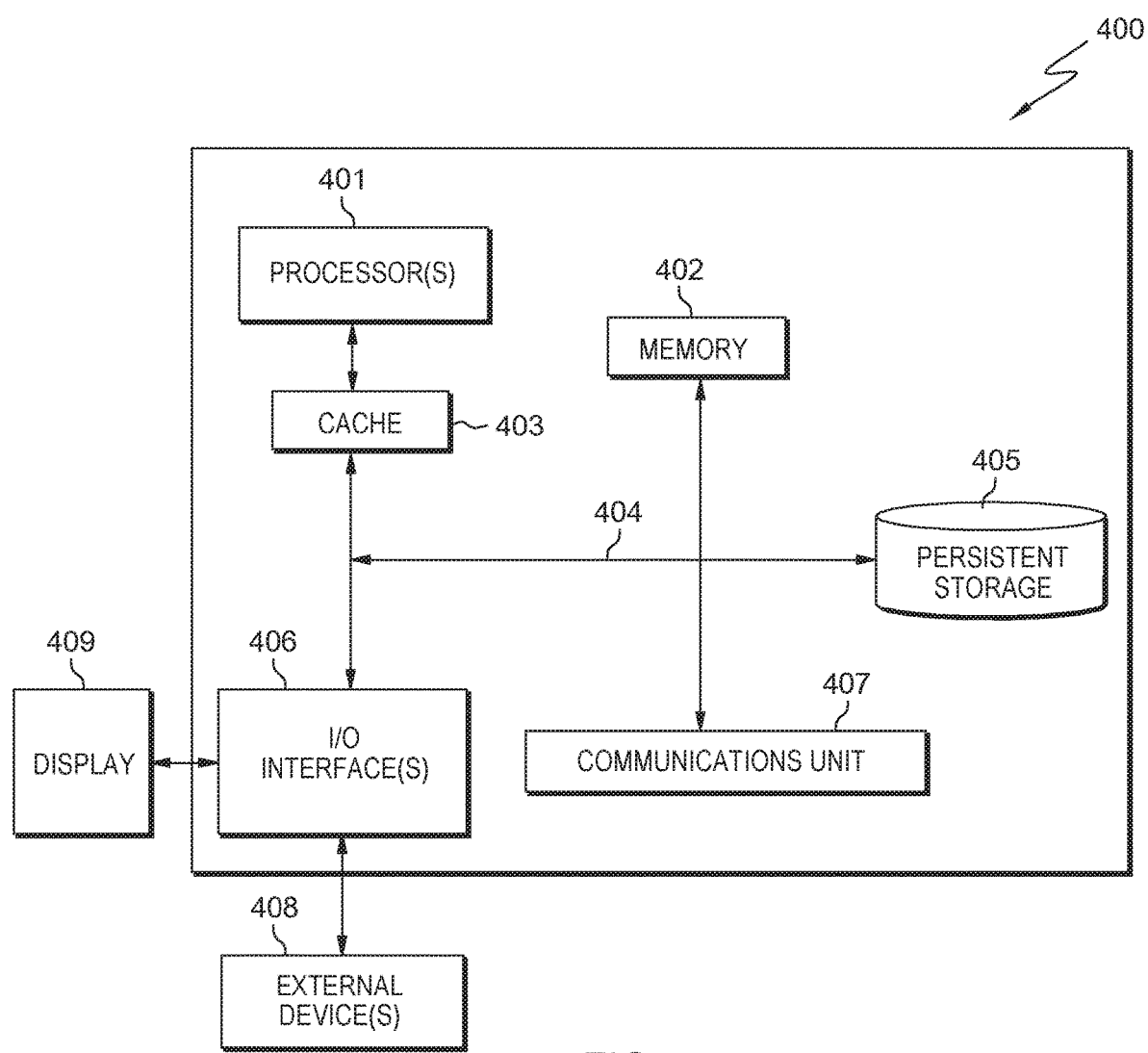
FIG. 4 depicts a block diagram of the components of the computing environment of FIG. 1, in accordance with an embodiment of the present invention.

FIG. 4 depicts computer system 400 which is an example of a system that includes guided search program 138. Computer system 400 includes processors 401, cache 403, memory 402, persistent storage 405, communications unit 407, input/output (I/O) interface(s) 406 and communications fabric 404. Communications fabric 404 provides communications between cache 403, memory 402, persistent storage 405, communications unit 407, and input/output (I/O) interface(s) 406. Communications fabric 404 can be implemented with any architecture designed for passing data and/or control information between processors (such as microprocessors, communications and network processors, etc.), system memory, peripheral devices, and any other hardware components within a system. For example, communications fabric 404 can be implemented with one or more buses or a crossbar switch.

Memory 402 and persistent storage 405 are computer readable storage media. In this embodiment, memory 402 includes random access memory (RAM). In general, memory 402 can include any suitable volatile or non-volatile computer readable storage media. Cache 403 is a fast memory that enhances the performance of processors 401 by holding recently accessed data, and data near recently accessed data, from memory 402.

Program instructions and data used to practice embodiments of the present invention may be stored in persistent storage 405 and in memory 405 for execution by one or more of the respective processors 401 via cache 403. In an embodiment, persistent storage 405 includes a magnetic hard disk drive. Alternatively, or in addition to a magnetic hard disk drive, persistent storage 405 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 405 may also be removable. For example, a removable hard drive may be used for persistent storage 405. Other examples include optical and magnetic disks, thumb drives, and smart cards that are inserted into a drive for transfer onto another computer readable storage medium that is also part of persistent storage 405.

Communications unit 407, in these examples, provides for communications with other data processing systems or devices. In these examples, communications unit 407 includes one or more network interface cards. Communications unit 407 may provide communications through the use of either or both physical and wireless communications links. Program instructions and data used to practice embodiments of the present invention may be downloaded to persistent storage 405 through communications unit 407.

I/O interface(s) 406 allows for input and output of data with other devices that may be connected to each computer system. For example, I/O interface 406 may provide a connection to external devices 408 such as a keyboard, keypad, a touch screen, and/or some other suitable input device. External devices 408 can also include portable computer readable storage media such as, for example, thumb drives, portable optical or magnetic disks, and memory cards. Software and data used to practice embodiments of the present invention can be stored on such portable computer readable storage media and can be loaded onto persistent storage 405 via I/O interface(s) 406. I/O interface(s) 406 also connect to display 409.

Display 409 provides a mechanism to display data to a user and may be, for example, a computer monitor.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer program product for using content analytics and ontology to generate insights from an Internet search, the computer program product comprising:
   one or more computer readable storage media; and
   program instructions stored on the one or more computer readable storage media, the program instructions comprising:
      program instructions to receive an input from a user indicating the user is viewing a first content on the Internet and said input indicates interest of the user in the first content as determined by an image device;
      responsive to receiving the input, program instructions to analyze the first content using video content analytics (VCA) to automatically detect and determine temporal and spatial events of the first content, wherein the analysis of the first content using VCA to automatically detect and determine the temporal and spatial events determines a plurality of topics included in the first content;
      program instructions to determine one or more content related to the first content, wherein the one or more content is determined using an ontology and the plurality of topics detected and determined by the temporal and spatial events of the first content analyzed using VCA;
      program instructions to rank the determined one or more content, wherein rankings are based on nearness of the determined one or more content to the first content;
      program instructions to display an interest panel associated with more than one user via a gesture or spoken word;
      program instructions to add a first node to the interest panel, wherein the first node is a link to the determined one or more content, and wherein the interest panel is an area displayed on a user interface comprising one or more nodes;
      program instructions to add a second node to the interest panel, wherein the second node is created by the user, wherein user created nodes and nodes linked to determined content are visually distinguishable from one another on the interface panel;
      program instructions to receive an indication from the user selecting the first node;
      responsive to receiving the indication from the user selecting the first node, program instructions to display the determined one or more content associated with the first node; and
      program instructions to save the interest panel.

2. The computer program product of claim 1, further comprising program instructions stored on the one or more computer readable storage media, to:
   receive an indication from the user to modify the second node;
   modify the interest panel, wherein the modifying includes connecting the second node to the first node; and
   save the modified interest panel.

3. The computer program product of claim 2, further comprising program instructions stored on the one or more computer readable storage media, to:
   responsive to connecting the second node to the first node in the interest panel, add a third node to the interest panel, wherein the third node includes content related to both the first node and the second node.

4. The computer program product of claim 1, wherein the interest panel is associated with a plurality of users.

5. The computer program product of claim 1, wherein the nearness is a measure of how close a meaning of a first term of a content of the one or more determined content is to a meaning of a second term of a topic of the plurality of topics, and wherein similar meanings are close and dissimilar meanings are farther apart.

6. The computer program product of claim 1, wherein the video content includes video tracking and egomotion.

7. The computer program product of claim 1, wherein the determined one or more related content is used as search terms by the user.

8. The computer program product of claim 1, further comprising program instructions stored on the one or more computer readable storage media, to:
   perform an ontology study of the first node and the second node;
   responsive to performing the ontology study, a relationship between the first node and the second node does not exist.

9. The computer program product of claim 8, further comprising:
   program instructions to use metadata, including descriptions of content and keywords linked to content to find a relationship between the first node and the second node.

10. The program product of claim 8, further comprising:
program instructions to look at a node history of the first node and the second node for common terms to find a relationship between the first node and the second node.

11. A computer system for using content analytics and ontology to generate insights from an Internet search, the computer system comprising:
one or more computer processors;
an image device coupled to the one or more computer processors;
one or more computer readable storage media; and
program instructions stored on the one or more computer readable storage media for execution by at least one of the one or more computer processors, the program instructions comprising:
program instructions to receive an input from a user indicating the user is viewing a first content on the Internet and said input indicates interest of the user in the first content as determined by the image device;
responsive to receiving the input, program instructions to analyze the first content using video content analytics (VCA) to automatically detect and determine temporal and spatial events of the first content, wherein the analysis of the first content using VCA to automatically detect and determine temporal and spatial events determines a plurality of topics included in the first content;
program instructions to determine one or more content related to the first content, wherein the one or more content is determined using an ontology and the plurality of topics detected and determined by the temporal and spatial events of the first content analyzed using VCA;
program instructions to rank the determined one or more content, wherein rankings are based on nearness of the determined one or more content to the first content;
program instructions to display an interest panel associated with more than one user via a gesture or spoken word;
program instructions to add a first node to the interest panel, wherein the first node is a link to the determined one or more content, and wherein the interest panel is an area displayed on a user interface comprising one or more nodes;
program instructions to add a second node to the interest panel, wherein the second node is created by the user, wherein user created nodes and nodes linked to determined content are visually distinguishable from one another on the interface panel;
program instructions to receive an indication from the user selecting the first node;
responsive to receiving the indication from the user selecting the first node, program instructions to display the determined one or more content associated with the first node; and
program instructions to save the interest panel.

12. The computer system of claim 11, further comprising program instructions stored on the one or more computer readable storage media for execution by at least one of the one or more computer processors, to:
receive an indication from the user to modify the second node;
modify the interest panel, wherein the modifying includes connecting the second node to the first node; and
save the modified interest panel.

13. The computer system of claim 12, further comprising program instructions stored on the one or more computer readable storage media for execution by at least one of the one or more computer processors, to:
responsive to connecting the second node to the first node in the interest panel, add a third node to the interest panel, wherein the third node includes content related to both the first node and the second node.

14. The computer system of claim 11, wherein the interest panel is associated with a plurality of users.

15. The computer system of claim 11, wherein the nearness is a measure of how close a meaning of a first term of a content of the one or more determined content is to a meaning of a second term of a topic of the plurality of topics, and wherein similar meanings are close and dissimilar meanings are farther apart.

16. The computer system of claim 11, wherein the video content analytics includes video tracking and egomotion.

17. The computer system of claim 11 further comprising program instructions stored on the one or more computer readable storage media for execution by at least one of the one or more computer processors, to:
perform an otology study of the first node and the second node;
responsive to performing the ontology study, a relationship between the first node and the second node does not exist.

18. The computer system of claim 17, further comprising:
program instructions to look at a node history of the first node and the second node for common terms to find a relationship between the first node and the second node.

* * * * *